United States Patent [19]
Braunhut

[11] 3,750,316
[45] Aug. 7, 1973

[54] DEVICE FOR SECRETLY OBSERVING VISUAL INTELLIGENCE

[76] Inventor: Harold N. Braunhut, c/o Honey Toy Industries, Inc., 200 Fifth Ave., New York, N.Y. 10010

[22] Filed: Nov. 1, 1971

[21] Appl. No.: 194,422

[52] U.S. Cl. .................................. 40/137, 272/8 D
[51] Int. Cl. ............................................ G09f 19/14
[58] Field of Search ............ 40/137, 106.51, 106.52; 272/8 D, 8 P

[56] References Cited
UNITED STATES PATENTS
3,524,789  8/1970  Olsen .................................... 161/6
3,653,138  4/1972  Cooper ......................... 40/28 C UX
2,998,667  9/1961  Darnell et al. ..................... 40/132 R Primary Examiner—Robert W. Michell
Assistant Examiner—John F. Pitrelli
Attorney—Abraham Friedman and Abraham Goodman

[57] ABSTRACT

A device for secretly observing visual intelligence. The device comprises a louvered arrangement of transparent and opaque zones extending in alternate succession, the opaque zones acting to permit observation from one direction along one surface of the louvered arrangement, through the transparent zones, of visual intelligence positioned along an opposite surface of the louvered arrangement, yet prevent observation of said visual intelligence from a counter-direction along said one surface.

7 Claims, 4 Drawing Figures

PATENTED AUG 7 1973

DEVICE FOR SECRETLY OBSERVING VISUAL INTELLIGENCE

BACKGROUND OF THE INVENTION

The present invention relates generally to devices which permit simulation of mind-reading, and more particularly to a device for secret observing visual intelligence.

The art of mind-reading generally employs various methods and devices for predetermining or accumulating information from a subject so as to, thereafter, inform the subject of the information, in a manner simulating mind-reading, without the subject having been aware that the information had first been taken from him. For example, the information may have first been obtained through interviews, or the like, in which the subject was not told of the reason for imparting such information, or the subject may have first recorded written information upon a paper superposed upon a pad, or the like, the pad simultaneously being formed with imprints or impressions of the recorded written information. Other devices such as a hidden or concealed mirror for secretly viewing intelligence possessed by the subject are often utilized likewise. Or, by employing subtleties such as the use of fingernail-writers or scribes, one may secretly write the correct information after it has been given under the pretence that it was duplicated beforehand; or, the forcing of predetermined information such as a page number in a book or a certain playing card seemingly chosen at random, and the practice of switching or exchanging the paper or material containing the information for a like or substitute article which would appear to be the original, enables the mind-reader to obtain the secret information supposedly in the possession of his subject. Clearly, these devices or methods of obtaining or predetermining information from a subject so as to permit a simulation of mind-reading or a display of what is commonly known as Extra-Sensory-Perception, are often less than most reliable since, in fact, most of the methods commonly used, have been exposed from time to time by investigators who have published or otherwise revealed the methods used, and many subjects are either aware or suspicious of the manner by which the information was obtained.

SUMMARY OF THE INVENTION

Accordingly, it is an object of the present invention to provide a device for secretly observing visual intelligence remaining in the possession of the subject while under constant scrutiny at all times to obviate the use of any auxiliary or trickster devices or ploys for relaying the intelligence, the latter appearing concealed and remaining in the possession of the subject at all times.

It is another object of the present invention to provide a device for secretly observing visual intelligence which, when examined by a subject, will impart an appearance of complete opacity, yet which is at least partially transparent for permitting the observation of recorded information in a preferred direction, which information is concealed in a counter-direction insofar as the subject is concerned.

To this end, the present invention generally relates to a device for secretly observing visual intelligence comprising a louvered arrangement of transparent and opaque zones extending in alternate succession, the opaque zones acting to permit observation from one direction along one surface of the louvered arrangement, through the transparent zones, of visual intelligence positioned along an opposite surface of the louvered arrangement, yet prevent observation of said visual intelligence from a counter-direction along said one surface. An opaque sheet extends in superposed relation with the louvered arrangement and is operatively associated with the latter for permitting interpositioning between the louvered arrangement and the opaque sheet of the visual intelligence such that the latter is observable from said one direction. Morever, the opaque sheet acts to impart to the transparent zones an appearance of opacity when the visual intelligence is absent between the louvered arrangement and the opaque sheet and, thereby, conceal the transparent nature of the transparent zone universally from all directions.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which.

DETAILED DESCRIPTION OF THE INVENTION

Figure 1:
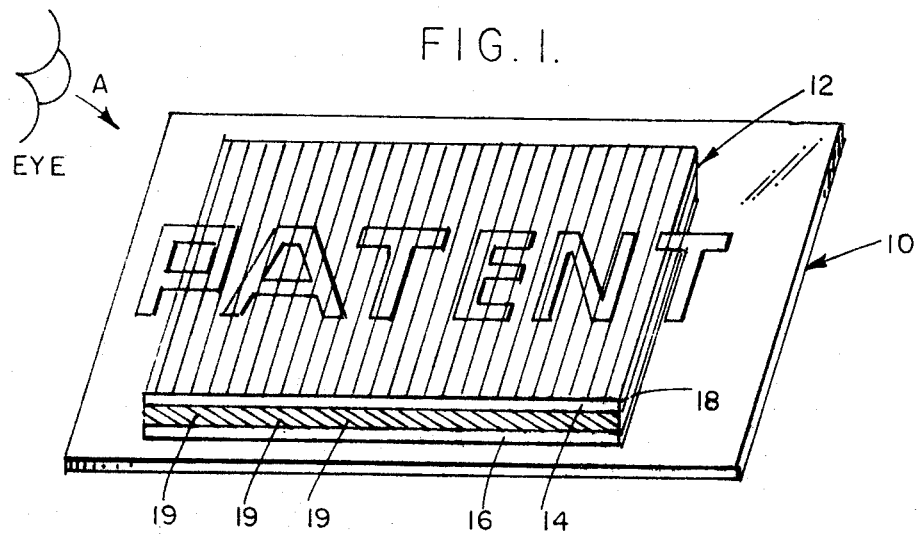
FIG. 1 is a perspective view illustrating the operative principal of the present invention, wherein written information is visible to an observer looking in one direction.
Figure 2:
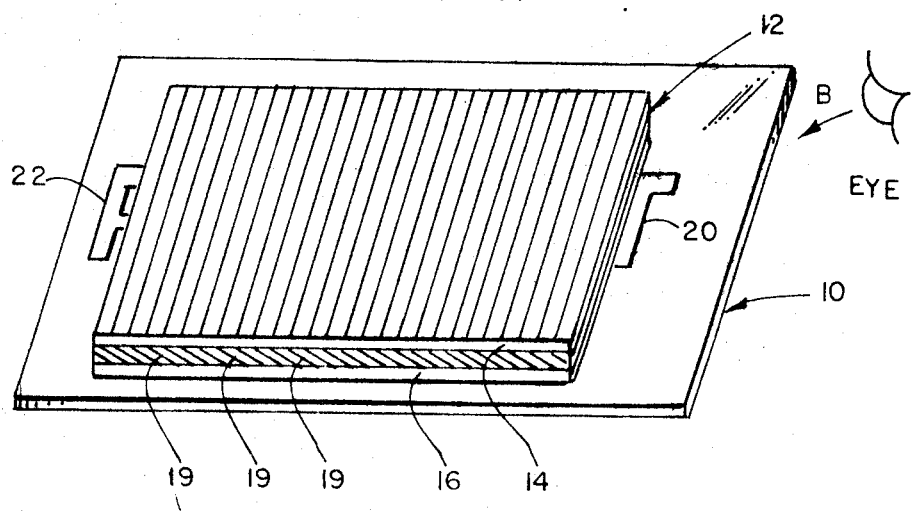
FIG. 2 is a view similar to that of FIG. 1, wherein the written information is concealed from an observer looking at the arrangement in a direction generally counter to that of the direction of observation in FIG. 1.

Referring now to the drawings, the principal of the present invention is most clearly evident in FIGS. 1 and 2. In this respect, there is provided a sheet 10 constituted of paper, plastic or any other suitable substance upon which may be imprinted written information such as the word "patent" or other visual intelligence. Overlying the sheet 10 is a composite unit 12, commonly known as "Light Control Film," manufactured by the 3M Company, formed with an upper transparent sheet 14, a lower transparent sheet 16 and a louvered array 18 of both transparent and opaque zones interposed between the sheets 14 and 16 respectively. The louvered array 18 of transparent and opaque zones is constituted generally of a plurality of longitudinally extending opaque elements 19, which elements 19 are commonly inclined laterally relative to the upper and lower sheets 14 and 16, respectively, at an angle of substantially 30°, the composite unit 12 being constituted, at least in part, preferably of cellulose acetate butyrate, although polycarbonate or other suitable substance may be used likewise. The opaque elements 19 may be provided in the composite unit 12 by forming closely spaced inclined slits in the portion denoted by the reference character 18, such as by etching, engraving or other suitable means, and thereafter filling the slits with an opaque pigment.

The basic principal of the present invention rests upon the relationship of the composite unit 12 with that of a sheet 10 upon which is provided visual intelligence. In this respect, when the composite unit 12 is placed in overlying superposed relation with that of the sheet 10, the visual intelligence provided on the sheet 10 will be secretly observable or visible in one direction such as that of the "EYE" or an observer, in FIG. 1, observing the arrangement along the direction of arrow A, and unobservable or concealed relative to the "EYE" of an observer looking at the arrangement in a generally counter-direction such as that of arrow B in FIG. 2. The concealed nature of the word "patent" is evident in FIG. 2, as emphasized illustratively by the fact that the end portion 20 of the letter T and the end portion 22 of the letter P are partially exposed, whereas the remainder of the aforesaid letters, and those letters A, T, E and N, are all concealed when the sheet 10 is observed in the direction of arrow B in FIG. 2.

The basis for the capacity of observing visual intelligence in one direction and the incapacity for observing visual intelligence in a counter-direction rests in the relationship of the opaque elements 19 which extend or define a louvered array defined by the reference character 18 and spaced from one another through the intermediary of transparent zones defined by transparent cellulose acetate butyrate. Therefore, the angle of inclination of the louvered opaque elements 19 determines the direction along which observation of the visual intelligence, provided on the sheet 10, is permissible.

Figure 3:
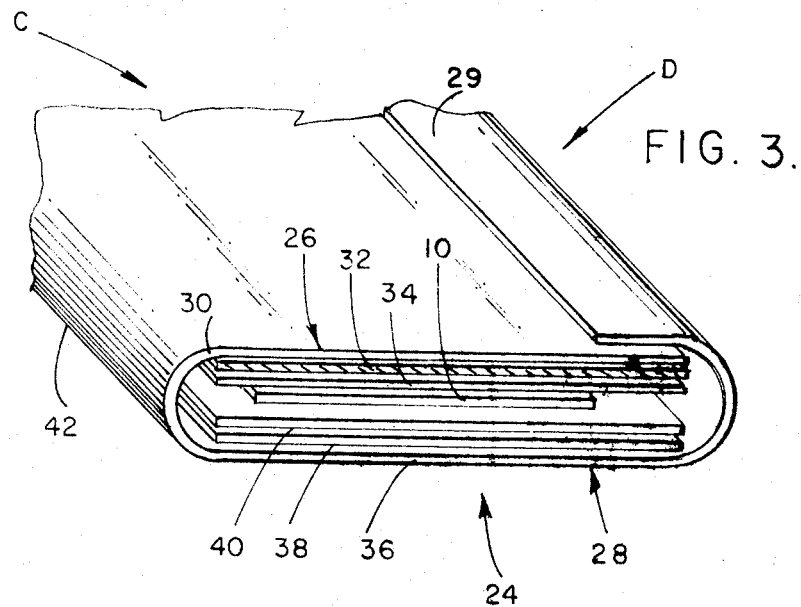
FIG. 3 is a fragmentary perspective view of a preferred embodiment pursuant to the present invention.
Figure 4:
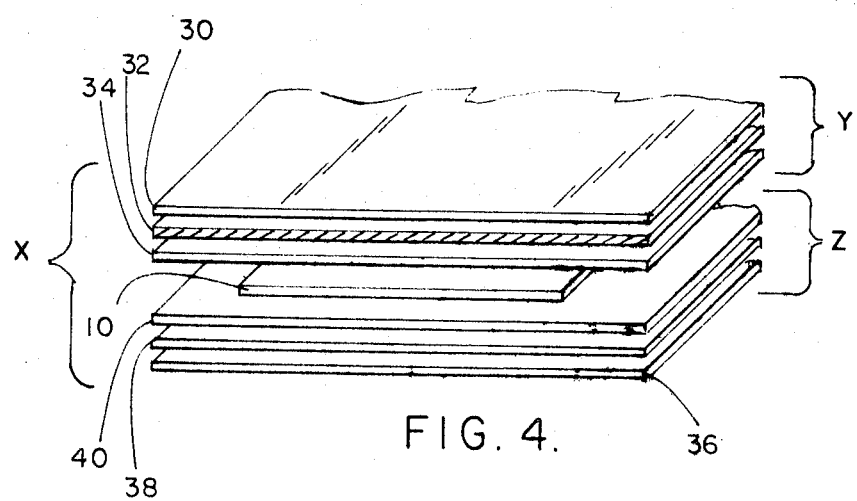
FIG. 4 is an exploded fragmentary perspective view of the operative association of each of the elements of the present invention with one another.

Referring now to FIGS. 3 and 4, the present invention may be practiced in the form of a preferred embodiment 24 and denoted by the bracket X in FIG. 4. In this respect, the preferred embodiment includes a top cover unit 26, denoted by the bracket Y in FIG. 4, and a bottom cover unit 28, denoted by the bracket Z in FIG. 4, the bottom cover unit 28 terminating in a closure flap 29 which may be superposed into overlying relation with the top cover unit 26 and connected thereto by suitable means (not shown) in a manner generally illustrated in FIG. 3. As is most evident in FIG. 4, the top cover unit 26 is a composite unit and includes an outer transparent sheet 30, a louvered array 32 of both transparent and opaque members and an inner transparent sheet 34 all interconnected to, or associated with, one another in a manner discussed above for the composite unit 12.

The bottom cover unit 28, constituted preferably of plastic, on the other hand, is provided with an outer transparent sheet 36, an opaque sheet 38 and an inner transparent sheet 40, all interconnected to one another as a composite unit by suitable means.

In operation, the present invention may be utilized by releasing the closure flap 29 from the top cover unit 26 and elevating the top cover unit 26 relative to the bottom cover unit 28 in a general pivotal manner, the top cover unit 26 and bottom cover unit 28 being generally hingedly associated with one another along the edge 42 illustrated in FIG. 3. Thereafter, a sheet such as sheet 10, upon which is provided appropriate visual intelligence, may be inserted or interposed between the top and bottom cover units 26 and 28 respectively such that the visual intelligence faces upwardly or contacts the inner transparent sheet 34 of the top cover unit 26. Thus, the visual intelligence may be observable in a direction along arrow C in FIG. 3 and unobservable in a direction along arrow D in the latter FIGURE.

As those skilled in the art will readily understand, the preferred embodiment 24 may be utilized for permitting simulation of mind-reading in a very simple and effective manner. In this respect, in order to perform a simulation of mind-reading or simulated display of Extra-Sensory-Perception, a subject is chosen who is unaware of the inherent features of the association of the various components, with one another, of the preferred embodiment 24. In order to properly execute a display of thought detection, the first step must be to permit the subject to examine the embodiment 24 prior to insertion of a sheet upon which is provided visual intelligence as aforementioned. In this respect, when the subject examines or inspects the embodiment 24, whether the subject holds the embodiment up to the light, or in any orientation, notwithstanding the extent of scrutiny utilized by the subject upon his examination of the embodiment 24, the entire embodiment appears to be of completely opaque nature.

The reason for the completely opaque nature imparted to the embodiment 24 is the fact that although there are transparent louvered zones, which are alternately spaced from one another successively, the opacity of the opaque sheet 38, in the bottom cover unit 28, when in superposed relation with that of the top cover unit 26, will completely disguise and conceal the transparent nature of each of the transparent zones universally from all directions.

Therefore, upon a completed examination of the embodiment 24, an examination, which of necessity, must exclude an opening of the top cover unit 26 relative to the bottom cover unit 28, the execution of the simulated mind-reading may proceed.

Clearly, as those skilled in the art will readily understand, should the subject upon elevating the top cover unit 26, relative to the bottom cover unit 28 and, thereby, displace the units 26 and 28 respectively out of superposed relation with one another, the opacity of the opaque sheet 38 cannot be imparted to the transparent zones of the louvered array 32 extending in the top cover unit 26. Thus, the subject would immediately become aware of the operative principal of the invntion. The subject should, therefore, not be permitted to open the closure flap 29 during inspection of the device.

The simulated display proceeds by having the subject write information of alphabetical, numerical, symbolic or other intelligence of visual nature on a sheet such as sheet 10 and insert the sheet so that the recorded information is exposed to or contacts the top cover unit 26. Moreover, the subject must be persuaded not to disturb the general predetermined alignment of the embodiment 24 as it is predisposed opposite the subject in a preferred direction so that the recorded information is secretly observable only in direction C, the direction of which is illustrated in FIG. 3, by the person performing the simulated mind-reading, and unobservable in the direction of arrow D, in FIG. 3, by the subject.

Thus, the subject is totally unaware that the information recorded on the sheet 10, and interposed between the top and bottom cover units 26 and 28 respectively, is secretly observable by the person performing the simulated mind-reading, this because the subject can only observe opacity of the arrangement in a direction along arrow D, illustrated in FIG. 3. The subject, therefore, relies upon his earlier examination of the embodiment 24, during which he was convinced that the top and bottom cover units 26 and 28, respectively, are of completely opaque nature.

The person performing the simulated mind-reading upon observing the recorded information, will then proceed to turn away from the subject and pretend that he is in deep concentration and, thereafter, record the information on a suitable surface.

The subject is then told to remove the sheet 10 from the embodiment 24 and, thereafter, close the closure flap 29 so that the top and bottom cover units 26 and 28 respectively are again in superposed relation. The subject is then exposed to the information duplicated by the person performing the simulation of mind-reading and is surprised at the exact duplication of the information recorded on the sheet 10. The subject may again, thereafter, wish to examine the embodiment 24, however, because of the superposed relationship of the top and bottom cover units 26 and 28, respectively, with one another, and the absence of the sheet 10 therebetween the opacity of the opaque sheet 38 is again imparted to the transparent zones of the louvered array 32 and this again competely conceals the transparent nature of these transparent zones, the entire embodiment 24 appearing to be opaque from all directions universally.

In order to ensure that the features of the embodiment 24 are most reliably maintained in secrecy, at least insofar as the subject upon whom the display of mind-reading is being effected is concerned, the opaque elements 19 of the louvered array 32 and the opaque sheet 38 should be generally of identical color, including black. Moreover, it should be understood that the reason for interpositioning the opaque sheet 38 between the sheets 36 and 40 respectively is to impart to the bottom cover unit 28 a thickness which is generally identical to that of the top cover unit 26, so that inspection by the subject will not result in ostensible distinctions between the cover units 26 and 28 respectively and, thereby, make the subject suspicious.

It has also been determined that the opaque sheet 40 in FIG. 4 may be replaced by a sheet identical to that of the louvered array 32, the inclination of the opaque louvers of the array 32 being reversed from the louvers in that sheet substituted for sheet 40 and offset relative to the latter such that the opaque zones of one sheet overlie the transparent zones of the other. Because of the reversed arrangement of louvers, both sheets when superposed will impart to the other an appearance of opacity, yet will respectively permit observation of visual intelligence therebetween along their respective exposed surfaces, each in the same and one direction.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A device for secretly observing visual intelligence; said device comprising observing means including a louvered array of transparent and opaque zones extending in alternate succession; said opaque zones including a plurality of spaced opaque elements extending longitudinally parallel to one another; each of said opaque elements including a surface inclined relative to an outer surface of said observing means to permit observation from one direction along said outer surface, through said transparent zones, of visual intelligence positioned along an opposite inner surface of said observing means and to prevent observation of said visual intelligence from a counter-direction along said outer surface; a sheet associated with said observing means; spacing means positioning said observing means and said sheet in superposed relation with said sheet confronting said inner surface of said observing means for defining a space between said observing means and said sheet for insertion of said visual intelligence therebetween, said sheet including opaque means of generally identical color as that of said opaque elements to impart to said transparent zones an appearance of opacity when said visual intelligence is absent between said observing means and said sheet and thereby concealing transparent nature of said transparent zones universally in all directions.

2. A device as claimed in claim 1 wherein said observing and opaque means each includes a sheet of plastic derivation.

3. A device as claimed in claim 14 wherein said transparent zones include transparent cellulose acetate butyrate interconnecting said opaque elements in fixed relation with one another.

4. A device as claimed in claim 3 wherein said observing means includes a pair of opposing transparent sheets between which is interposed said transparent cellulose acetate butyrate.

5. A device as claimed in claim 4 wherein said opaque elements are inclined relative to said pair of opposing sheets at an angle of substantially 30°.

6. A device as claimed in claim 1 wherein said observing means and said sheet are generally hingedly associated with one another into and out of superposed relation.

7. A device as claimed in claim 1 wherein said sheet includes a pair of transparent sheets between which is fixedly interposed said opaque means.

* * * * *